United States Patent
Mitsuoka et al.

(10) Patent No.: US 6,744,030 B2
(45) Date of Patent: Jun. 1, 2004

(54) OPTICAL WAVEGUIDE PROBE AND MANUFACTURING METHOD OF THE SAME, AND SCANNING NEAR-FIELD OPTICAL MICROSCOPE

(75) Inventors: Yasuyuki Mitsuoka, Chiba (JP); Takashi Niwa, Chiba (JP); Kenji Kato, Chiba (JP); Manabu Oumi, Chiba (JP); Nobuyuki Kasama, Chiba (JP); Susumu Ichihara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 208 days.

(21) Appl. No.: 09/837,836

(22) Filed: Apr. 18, 2001

(65) Prior Publication Data

US 2001/0038063 A1 Nov. 8, 2001

(30) Foreign Application Priority Data

Apr. 19, 2000 (JP) ......................................... 2000-117967
Mar. 19, 2001 (JP) ......................................... 2001-078891

(51) Int. Cl.[7] .................................................. H01J 3/14
(52) U.S. Cl. .................................... 250/201.3; 250/216
(58) Field of Search ............................. 250/201.3, 306, 250/234, 216, 307

(56) References Cited

FOREIGN PATENT DOCUMENTS

| EP | 0622652 | 11/1994 |
|---|---|---|
| EP | 0801318 | 10/1997 |
| EP | 0964251 | 12/1999 |
| WO | 95005000 | 2/1995 |

*Primary Examiner*—Scott J. Sugarman
*Assistant Examiner*—Richard Hanig
(74) *Attorney, Agent, or Firm*—Adams & Wilks

(57) ABSTRACT

An optical waveguide probe is disclosed which is used for a scanning near-field optical microscope, has a low light propagation loss, and is capable of performing an AFM operation, and a manufacturing method thereof is disclosed. The vicinity of the tip of an optical waveguide 2 is bent toward a side of a probe portion 9 through a plurality of surfaces symmetrical with respect to a plane including an optical axis of the optical waveguide 2. By this, a loss of a propagated light 7 at a bent portion 10 is reduced, and the propagated light 7 can be condensed to a minute aperture 5, so that near-field light can be efficiently emitted from the minute aperture 5.

20 Claims, 9 Drawing Sheets

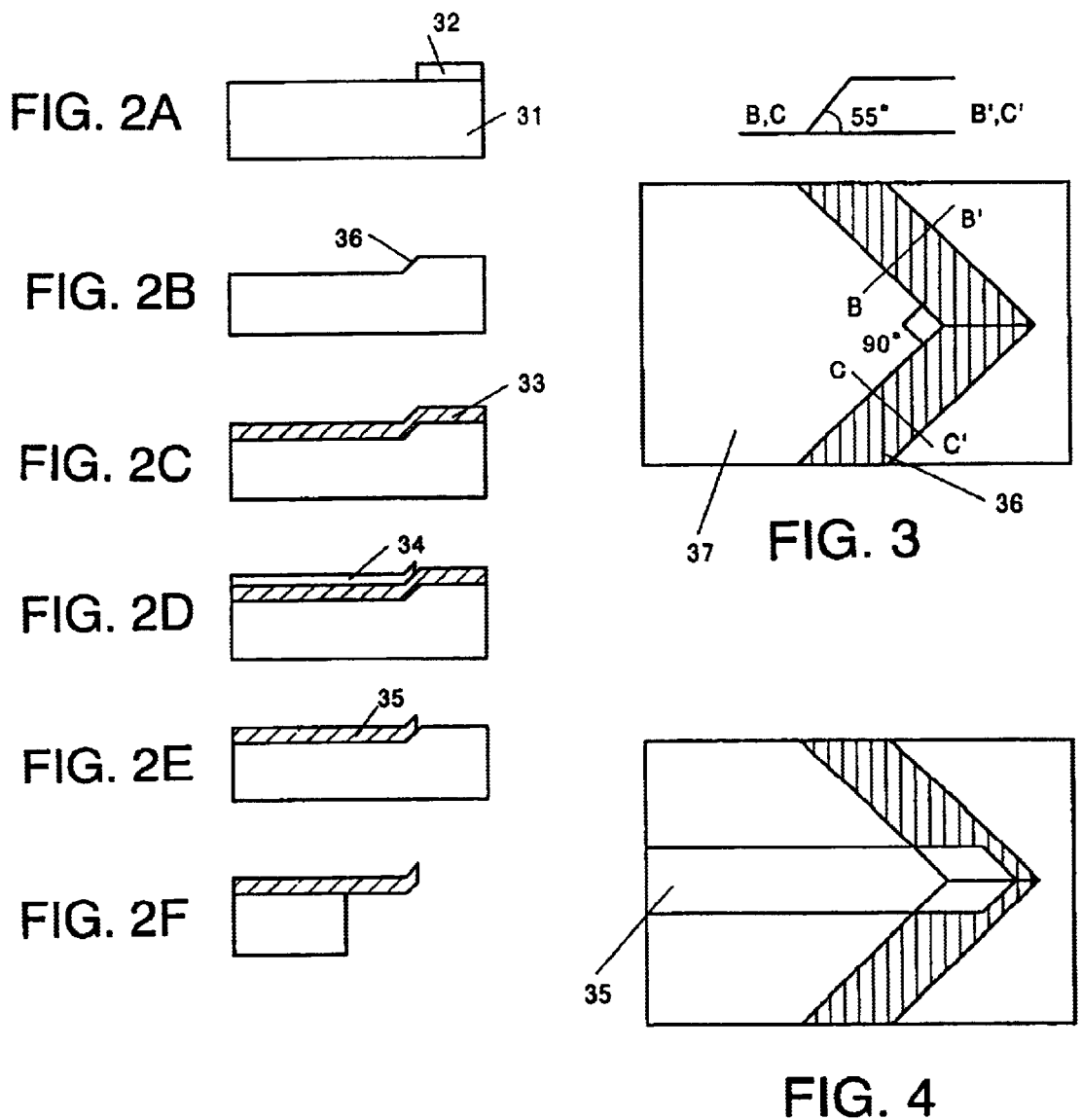

OPTICAL WAVEGUIDE PROBE AND MANUFACTURING METHOD OF THE SAME, AND SCANNING NEAR-FIELD OPTICAL MICROSCOPE

BACKGROUND OF THE INVENTION

The present invention relates to an optical probe for observing and measuring optical characteristics of a sample in a minute region by using near-field light, and particularly to an optical waveguide probe made of an optical waveguide and a manufacturing method of the same.

At present, in a scanning near-field optical microscope (hereinafter abbreviated as SNOM), a probe having a sharpened tip and formed of an optical medium is made to approach a measured sample within a wavelength of light, so that the optical characteristic or shape of the sample is measured. As one of this type of devices, a device is proposed in which a tip of an optical fiber probe held vertically with respect to a sample is vibrated horizontally with respect to the surface of the sample, a change of vibration amplitude generated by shear force between the surface of the sample and the tip of the probe is detected through a change of shadow of laser light irradiated to the tip of the probe, and the sample is moved by a fine moving mechanism to make the amplitude constant, so that an interval between the tip of the probe and the surface of the sample is kept constant, whereby a surface shape is detected from the intensity of a signal inputted to the fine moving mechanism, and the measurement of optical transparency of the sample is carried out.

Besides, a scanning near-field atomic force microscope is proposed in which an optical fiber probe formed like a hook is used as a cantilever of the atomic force microscope (hereinafter abbreviated as AFM), and at the same time as an AFM operation, laser light is irradiated to a sample from a tip of the optical fiber probe, so that a surface shape is detected and optical characteristics of the sample are measured (Japanese Patent Unexamined Publication No. Hei. 7-174542). In this optical fiber probe, an optical fiber is used as an optical medium, and the periphery of the optical fiber is covered with a metallic film coating. A probe portion is sharpened, and an aperture is provided at the tip of the probe portion.

Besides, an optical waveguide probe is also known in which an optical waveguide is made of a laminate of a core and a cladding to be constructed like a cantilever, a sharpened probe portion is formed at one end, a support portion for fixing the optical waveguide is formed at the other end, and the optical waveguide at the side of the probe portion has a curved structure.

However, the optical fiber probe used in the SNOM is manufactured by using an optical fiber as a material through many handwork steps, so that there are problems that mass productivity is low, and a shape, such as a tip diameter or a tip angle of a probe portion, or a diameter of an aperture, is irregular. Besides, in order to perform probe scanning at high speed without damage, it is necessary that the resonance frequency of the probe is made high, and the spring constant is made small. However, since the optical fiber is used as the optical medium, there is a problem that it is difficult to miniaturize the probe and to provide the high resonance frequency and the low spring constant.

Further, there is a problem that in the probe in which the optical fiber or optical waveguide is curved, the loss of propagated light occurs at the curved portion, and the propagated light can not be efficiently propagated.

SUMMARY OF THE INVENTION

The present invention has been made in view of the above, and it is an object of the invention to provide an optical waveguide probe which is excellent in mass productivity, uniformity, and high speed scanning property, and can efficiently propagate a propagated light, and is to provide a manufacturing method for fabricating the optical waveguide probe.

In order to achieve the above object, an optical waveguide probe of the present invention comprises a cantilever-like optical waveguide, a probe provided at a tip of the optical waveguide and sharpened in a substantially vertical direction with respect to the optical waveguide, a minute aperture provided at a tip of the probe portion, and a bent portion where a vicinity of the tip of the optical waveguide is bent toward a side of the probe, and is characterized in that the bent portion has a deflecting function for deflecting a propagated light in the optical waveguide.

Besides, a deflection angle of the propagated light at the bent portion is 90 degrees or less.

Besides, the bent portion deflects the propagated light by a single surface.

Besides, the single surface is a surface orthogonal to an optical axis plane including an optical axis from the optical waveguide to the minute aperture.

Besides, the single surface is a surface which is not orthogonal to the optical axis plane.

Besides, an angle of the single surface with respect to a plane orthogonal to the optical axis plane and including an optical axis of the waveguide is 45 degrees or less.

The bent portion is bent at a plurality of surfaces substantially symmetrical with respect to an optical axis plane including an optical axis from the optical waveguide to the minute aperture.

Besides, the plurality of surfaces is a plurality of flat surfaces.

Besides, the plurality of flat surfaces is respectively not vertical to the optical axis plane.

Besides, the bent portion includes a reflecting film.

Besides, a guide for positioning an optical element is provided at a support portion of the optical waveguide.

Besides, the guide is a V groove.

According to the above optical waveguide probe, since the propagated light can be efficiently deflected at the bent portion, the efficiency of outgoing light from the minute aperture, or the efficiency of the detection of light at the minute aperture can be improved. Further, since the propagated light having been propagated through the optical waveguide can be condensed to the minute aperture, or to the contrary, since the light from the minute aperture can be collimated, the efficiency can be improved.

In order to achieve the above object, a manufacturing method of an optical waveguide probe according to the present invention comprises a substrate formation step of forming a substrate on which an optical waveguide is deposited, a deposition step of depositing the optical waveguide on the substrate, and a separation step of separating a part of the optical waveguide from the substrate, and is characterized in that in the substrate formation step, the bent-shaped substrate for bending the part of the optical waveguide is formed.

Besides, the substrate formation step is a step of forming the substrate including a lower surface parallel to an optical axis of the optical waveguide, and a plurality of surfaces which are not vertical to the lower surface and are substantially symmetrical with respect to a plane including the optical axis and a normal of the lower surface.

Besides, the substrate formation step is a step of forming the substrate by using an anisotropic etching.

Besides, a manufacturing method of an optical waveguide probe used for a scanning near-field optical microscope uses two substrates bonded to each other through a material having different etching characteristics and is characterized by comprising a step of forming a step portion for bending a part of an optical waveguide on one of the substrates, and a step of forming a guide for an optical element on the other substrates.

Besides, the substrate is a single crystal silicon substrate.

Besides, in the substrates, two single crystal silicon substrates having identical plane orientations are bonded to each other.

Besides, in the substrates, two single crystal silicon substrates having different plane orientations are bonded to each other.

Besides, in the substrates, the substrates are bonded so that an optical axis direction of the waveguide of the substrate forming a mold is coincident with an optical axis direction of the guide of the substrate forming the guide.

Besides, a core of the optical waveguide and a pattern for defining the guide for the optical element are simultaneously formed.

According to the above manufacturing method of the optical waveguide probe, the probe can be fabricated by laminating the optical waveguide on the substrate which becomes the mold, so that the mass productivity, shape reproducibility, and uniformity are improved. Besides, since a small optical waveguide probe can be fabricated, the optical waveguide probe having a low spring constant and a high resonance frequency can be fabricated. Thus, it becomes possible to make high speed scanning without damaging the probe. Besides, it becomes possible to form a bent portion which can efficiently propagate a propagated light.

BRIEF DESCRIPTION OF THE DRAWINGS

FIGS. 2A to 2F are explanatory views showing a manufacturing method of an optical waveguide probe according to embodiment 2 of the present invention;

FIG. 3 is an explanatory view in a manufacturing step of the optical waveguide probe according to the embodiment 2 of the present invention;

FIG. 4 is an explanatory view in a manufacturing step of the optical waveguide probe according to the embodiment 2 of the present invention;

DESCRIPTION OF THE PREFERRED EMBODIMENTS

Hereinafter, embodiments of the present invention will be described in detail with reference to the drawings. The present invention is not restricted to the embodiments.

(Embodiment 1)

Figure 1A:
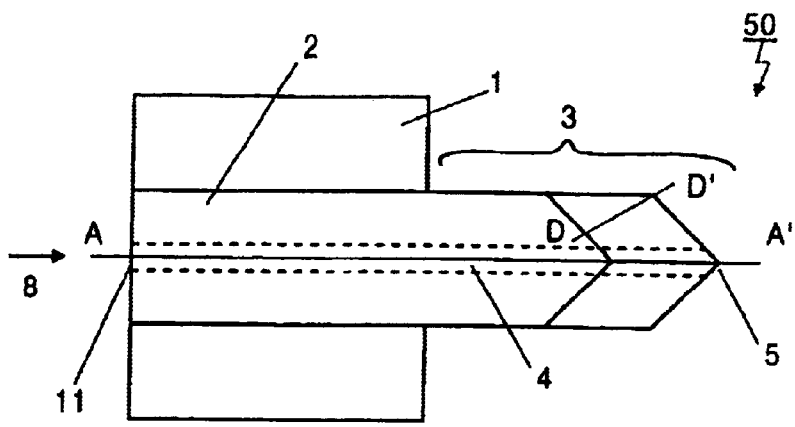
FIGS. 1A to 1D are structural views showing a structure of an optical waveguide probe according to embodiment 1 of the present invention.
Figure 1B:
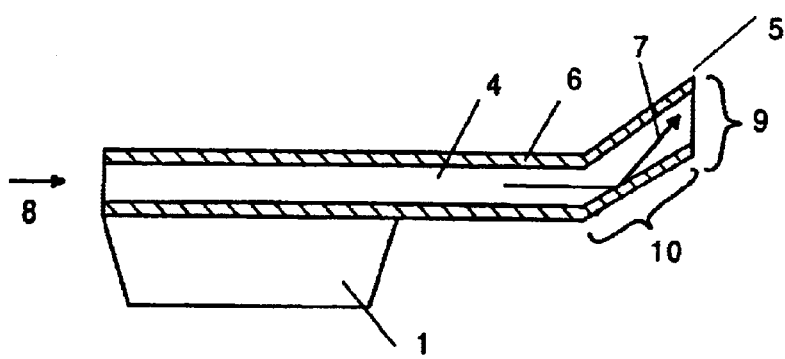
Figure 1D:
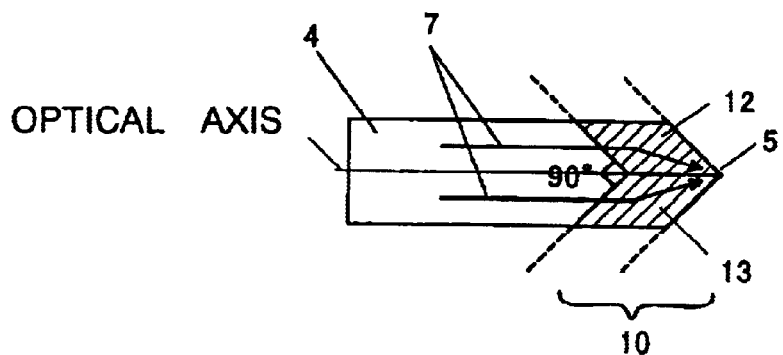
Figure 1C:
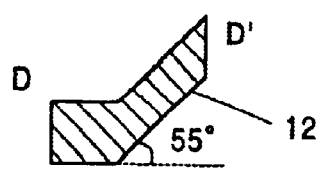

FIGS. 1A to 1D are structural views showing a structure of an optical waveguide probe according to embodiment 1 of the present invention. FIG. 1A is a top view, FIG. 1B is a sectional view taken along a section AA', FIG. 1C is a sectional view taken along a section DD', and FIG. 1D is an enlarged schematic view showing a state of light propagation.

An optical waveguide probe 50 is formed by an optical waveguide 2 and a support portion 1 for supporting it. The optical waveguide 2 is laminated on the support portion 1 and is integrally formed. The optical waveguide 2 includes a cantilever-like elastic function portion 3 and a probe portion 9 at its tip. A bent portion 10 bent toward a side of the probe portion 9 is formed in the vicinity of the tip. The probe portion 9 is sharpened and includes a minute aperture 5 at its tip. The optical waveguide 2 is formed by a core 4 for propagating light at the substantially center portion and a cladding 6 at its outer peripheral portion. Although not shown, the elastic function portion 3 and the probe portion 9 are covered with light shielding films, and a portion of the tip of the probe portion 9 which is not covered with the light shielding film, becomes the minute aperture 5.

The refractive index of the cladding 6 is relatively small as compared with the refractive index of the core 4. The length of the elastic function portion 3 is, for example, 50 $\mu$m to 1000 $\mu$m. The length of the probe portion 9 is, for example, 1 $\mu$m to 30 $\mu$m. The sectional shape vertical to the optical axis of the core 4 is quadrangular, and the length of one side is 1 $\mu$m to 100 $\mu$m. The sectional shape of the optical waveguide 2 vertical to the optical axis is substantially quadrangular, and the length of one side is 5 $\mu$m to 500 $\mu$m. The thickness of the support portion 1 is, for example, 200 $\mu$m to 600 $\mu$m. The length and width of the support portion 1 is, for example, 1 mm to 50 mm. As materials of the core 4 and the cladding 6, it is possible to use various dielectric materials, for example, silicon dioxide, glass material such as silicon dioxide doped with fluorine or boron, organic material such as polyurethane or epoxy, metal oxide such as niobium oxide or zinc oxide, and the like. For the light shielding film, a material reflecting light, for example, gold, platinum, aluminum, chromium, or nickel can be used. The thickness of the light shielding film is, for example, 100 nm to 1 $\mu$m. The diameter of the minute aperture 5 is, for example, 10 nm to 500 nm.

In the optical waveguide 2, the probe portion 9 is formed at the tip of the elastic function portion 3, and the halfway portion of the elastic function portion 3 is bent toward the side of the probe portion 9. In this embodiment, as shown in FIG. 1D, the optical waveguide 2 is bent by the bent portion 10 where two flat surfaces 12 and 13 intersect with each other, and the core 4 is formed along the line of intersection of the two flat surfaces 12 and 13. As shown in FIG. 1C, the two flat surfaces 12 and 13 are inclined about 55 degrees with respect to the surface of the substrate 1 forming the optical waveguide 2, are symmetrical with respect to the plane (section AA') including the optical axis of the optical waveguide 2 and the minute aperture 5, and intersect with each other at 90 degrees.

After an incident light 8 from an incident end 11 is incident on the optical waveguide 2, it is propagated through the core 4. A propagated light 7 is reflected at the bent portion 10 and is introduced into the minute aperture 5. It is desirable that a difference in refractive index between the core 4 and the cladding 6 is sufficiently large, and the propagated light 7 is totally reflected by an interface therebetween. In the case where the total reflection does not occur, a reflecting film may be formed on the surface of the cladding 6. In such a structure, a deflection angle at which the propagated light 7 is deflected is small (for example, 90 degrees or less), and an incident angle of the propagated light 7 to the two flat surfaces 12 and 13 forming the bent portion 10 can be made small, so that the total reflection is apt to occur at the interface between the core 4 and the cladding 6, and a loss at the bent portion 10 can be reduced. Besides, the propagated light 7 is not directly reflected in the optical axis direction, but can be reflected to be condensed to the side of the minute aperture 5, and the propagated light 7 in the core 4 can be condensed to the vicinity of the minute aperture 5. Like this, in the bent portion 10, since the propagated light 7 in the core 4 is efficiently condensed and reflected to the minute aperture 5, near-field light having high intensity can be emitted from the minute aperture 5.

Also in the case where detection is made at the minute aperture 5 and light is propagated through the optical waveguide 2 in a reverse direction, similarly, the light can be efficiently reflected. Here, although the description has been given of the case, as an example, where the bent portion 10 is formed by the two flat surfaces 12 and 13, the respective surfaces may be curved surfaces, or the bent portion may be formed of, not two surfaces, but four or more surfaces.

In the case where an optical detector is disposed in the tip end direction of the optical waveguide 2, and the optical characteristics of a sample are observed in a reflection mode, since the minute aperture 5 is formed at the tip of the cantilever-like optical waveguide 2, there is not a large portion where a reflected light at the sample is blocked by the optical waveguide 2, and the reflected light at the sample can be efficiently detected.

As described above, according to the above optical waveguide probe 50, the incident light 8 is introduced from the incident end 11 of the optical waveguide 2, and the light can be irradiated to the measured sample from the minute aperture 5. Alternatively, light locally existing near the surface of the sample is detected through the minute aperture 5, and can be detected by a detector disposed behind the incident end (in this case, it becomes an outgoing end) 11 of the optical waveguide 2. The light irradiation and the light detection through the minute aperture can be efficiently carried out.

The elastic function 3 can be made small, and its spring constant and resonance frequency can be adjusted by the length and width of the elastic function portion 3. Thus, since the elastic function portion 3 can be made to have a small spring constant and a high resonance frequency, scanning can be made at high speed without damaging the sample and the probe.

(Embodiment 2)

FIGS. 2A to 2F are explanatory views showing a manufacturing method of the optical waveguide probe of the embodiment 1. FIGS. 3 and 4 are top views of FIGS. 2B and 2E respectively. FIG. 2A shows a state in which a silicon dioxide 32 which becomes a mask is patterned on a substrate 31. Although the substrate 31 is made of silicon, if a mold can be formed, a quartz substrate or the like may be used. FIG. 2B shows a step of forming a mold which becomes a bent portion of an optical waveguide, by using the patterned silicon dioxide 32 as a mask and by an anisotropic etching using potassium hydrate (KOH) or tetramethylammonium hydroxide (TMAH). The top view of this mold is FIG. 3. As shown by a section BB' (Which is also true of a section CC'), two inclined surfaces 36 each having an angle (about 55 degrees) with respect to a lower surface 37 of the substrate 31 are formed. The two surfaces intersect with each other at 90 degrees.

FIG. 2C shows a step of depositing an optical waveguide 33 on the bent mold. A cladding material is deposited on the bent mold, a patterned core material is deposited thereon, and a cladding material is further deposited thereon. As depositing methods of the core material and the cladding material, methods suitable for the materials are used. For example, in the case of silicon oxide, a vapor phase synthetic method (hereinafter abbreviated as CVD), sputtering, vacuum evaporation or the like is used. The refractive index of the cladding material is relatively smaller than the refractive index of the core material.

FIG. 2D shows a step of forming a mask 34 on the optical waveguide 33 for patterning it into a cantilever shape having a probe portion. FIG. 2E shows a step of patterning the optical waveguide 33 using the mask 34. The optical waveguide 33 can be patterned by dry etching or wet etching. FIG. 4 is a top view showing this state. An optical waveguide 35 including the probe portion is formed along the lower surface 37 and the inclined surfaces 36. The probe portion is sharpened in a substantially vertical direction with respect to the substrate 31.

FIG. 2F shows a step of separating a part of the optical waveguide 35 from the substrate 31. The substrate 31 is removed by etching while the substrate supporting the optical waveguide 35 is made to remain, so that the cantilever-like optical waveguide probe 50 is formed.

Further, although not shown, a film of metal (Al, Cr or the like) is formed around the cantilever-like optical waveguide 35, and a minute aperture is formed at the tip of the probe portion.

According to the above described steps, the optical waveguide probe 50 of the embodiment 1 can be manufactured easily and with excellent mass productivity and uniformity.

(Embodiment 3)

Figure 5:
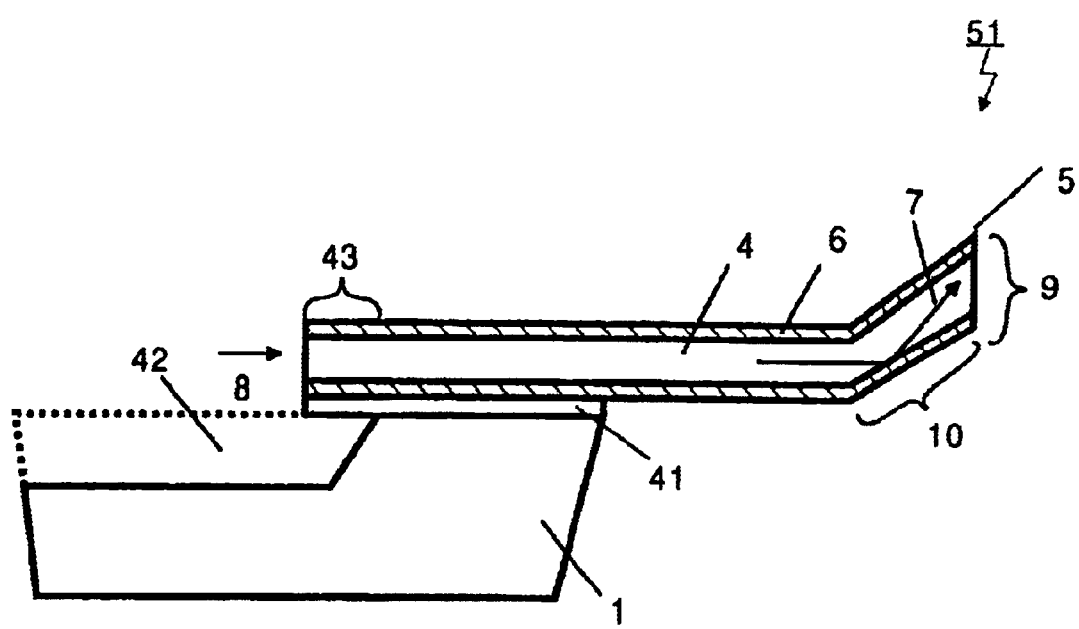
FIG. 5 is a structural view showing a structure of an optical waveguide probe according to embodiment 3 of the present invention.

An optical waveguide probe 51 according to embodiment 3 of the present invention will be described with reference to FIG. 5. Incidentally, portions similar to those of the optical waveguide probe 50 described in the embodiment 1 are designated by the same reference symbols and the description is omitted.

This optical waveguide probe includes, in addition to the elements constituting the optical waveguide probe 50, a support portion 1 provided with a V groove 42, a support layer 41 provided between the support portion 1 and a cladding 6, and a light introducing portion 43 made of the cladding 6 and a core 4 and protruding above the V groove 42. Incidentally, a structure in which the light introducing portion 43 is not provided may be adopted. Besides, the support layer 41 may not be provided.

By fixing an optical fiber to the V groove 42, it becomes easy to efficiently introduce light from the optical fiber into the core 4. Besides, in addition to the optical fiber, an optical element such as a semiconductor laser, a light-emitting diode, or a lens may be fixed to the V groove 42.

Figure 6A:
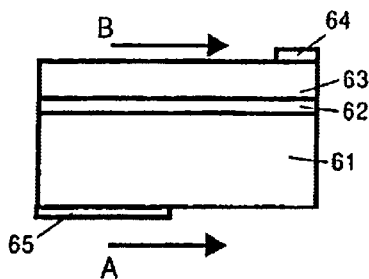
FIGS. 6A to 6J are explanatory views showing a manufacturing method of the optical waveguide probe according to the embodiment 3 of the present invention.

FIGS. 6A to 6J are views for explaining a manufacturing method of the optical waveguide probe 51. In the following, the upper side of the drawing is made as a front surface, and the lower side is made as a back surface. As shown in FIG. 6A, a start substrate (silicon on insulator substrate, hereinafter referred to as an SOI substrate) is used which includes a substrate 61 made of silicon, an oxide film 62 on the substrate 61, and an active layer 63 made of silicon formed on the oxide film. The active layer 63 and the substrate 61 are made of silicon single crystal of a (100) plane. Although a direction of an orienting flat of a (100) wafer is a <110> direction, in the start substrate of the present invention, the orienting flat direction of the active layer 63 is made to deviate from that of the substrate 61 by 45 degrees. That is, in FIG. 6a, in FIG. 6a, the crystal orientation of the substrate 61 indicated by arrow A is the <110> direction, the crystal orientation of the active layer indicated by arrow B in the drawing is a <100> direction, and the directions are respectively coincident with optical axis directions of the optical fiber and the optical waveguide 2 fixed in the V groove. A mask 64 for step portion formation is formed on the active layer 63. Besides, a mask 65 for release is formed at the back surface side of the substrate 61. As materials of the mask for step portion formation and the mask 65 for release, a material having resistance to anisotropic etching using KOH, TMAH or the like, for example, silicon dioxide or silicon nitride is used.

Figure 6B:
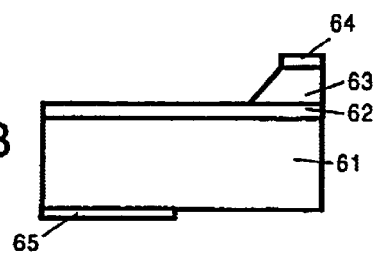

Next, as shown in FIG. 6B, from the front side, the active layer 63 is etched by the anisotropic etching using KOH, TMAH or the like to form a step portion. A top view at this time is the same as the state explained with reference to FIG. 3 in the embodiment 2.

Figure 6C:
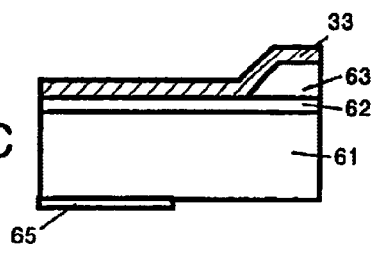

Next, after the mask 64 for step portion formation is removed, as shown in FIG. 6C, an optical waveguide 33 is formed. A forming method, a size, and a material of the optical waveguide are the same as those explained in the embodiment 1 and the embodiment 2.

Figure 6D:
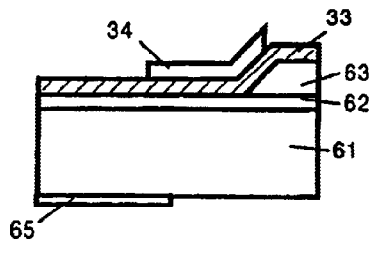
Figure 6E:
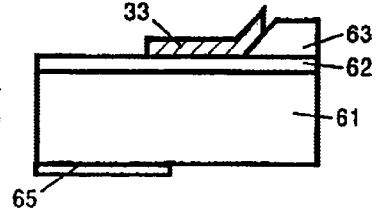

FIG. 6D shows a step of forming a mask 34 on the deposited optical waveguide 33 for patterning it into a cantilever shape having a probe portion. FIG. 6E shows a step of patterning the optical waveguide 33 by using the mask 34. The optical waveguide 33 can be patterned by dry etching or wet etching. The top view at this state is similar to the state of FIG. 4 explained in the embodiment 2.

Figure 6F:
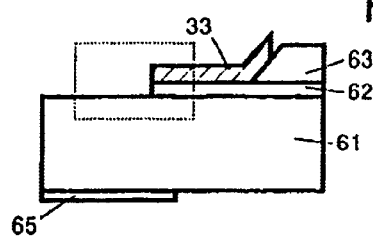
Figure 6G:
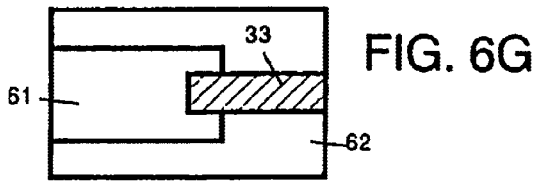

Next, as shown in FIG. 6F, the oxide film 62 is patterned, so that a mask for a V groove is formed. A top view of a portion surrounded by a broken line in FIG. 6F is shown in FIG. 6G.

Figure 6H:
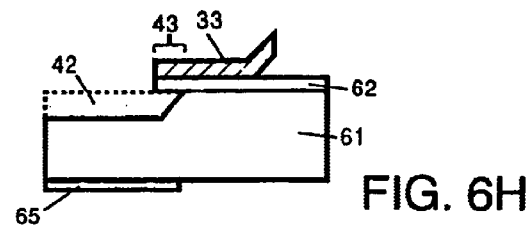

Next, as shown in FIG. 6H, by the anisotropic etching using KOH, TMAH, or the like, the V groove 42 is formed from the front surface side, and the active layer 63 is removed. Besides, the light introducing portion 43 can be formed through the pattern of the oxide film 62 explained in FIG. 6G.

Figure 6I:
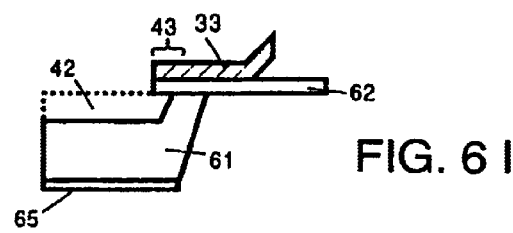
Figure 6J:
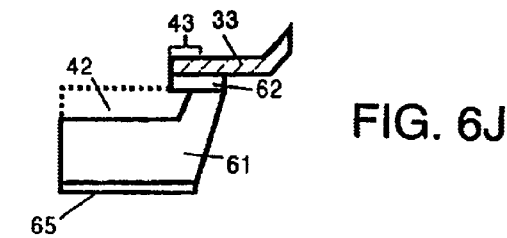

Next, as shown in FIG. 6I, the support substrate 61 is etched from the back surface side by a method such as anisotropic etching using KOH, TMAH or the like, or reactive ion etching (RIE), and a cantilever is released. At this time, since the oxide film 62 remains, the unnecessary oxide film 62 is removed as shown in FIG. 6J by dry etching by RIE from the back surface side. At this time, according to a thickness relation between the oxide film 62 and the mask 65 for release, the mask 65 for release remains or does not remain.

Thereafter, a light shielding film is formed on the optical waveguide 33 by sputtering or vacuum evaporation, and the minute aperture 5 is formed at the tip of the optical waveguide 33.

As described above, according to the optical waveguide cantilever 51 and its manufacturing method of the third embodiment of the present invention, since the oriental flat direction of the support substrate 61 and that of the active layer 63 are different from each other by 45 degrees, in addition to the optical waveguide cantilever 50 explained in the embodiments 1 and 2, the V groove 42 for introducing light into the core 4 can be easily formed. Accordingly, in addition to the effects explained in the embodiments 1 and 2, the light can be introduced into the core 4 efficiently and easily (illumination mode). Besides, the light detected at the minute aperture 5 can be efficiently detected through the core 4 and the optical fiber fixed to the V groove 42 (collection mode). Further, the foregoing illumination mode and the collection mode can be carried out simultaneously. Besides, in addition to the optical fiber, it is possible to position and fix an optical element, such as a lens or a filter, in the V groove 42, and it becomes easy to make light incident on the core 4 and/or to detect light from the core 4, and to control the wavelength and phase of incident light to the core 4 and/or outgoing light from the core 4.

Besides, by providing the light introducing portion 43, since the distance between the optical fiber and the core 4 can be lessened without being disturbed by the inclined surface of the V groove 42, light can be efficiently introduced into the core 4, and the intensity of near-field light irradiated from the minute aperture 5 can be made high. Besides, according to the manufacturing method of the optical waveguide cantilever 51 of the third embodiment of the present invention, the optical waveguide cantilever 51 can be easily fabricated. Since this manufacturing method is a batch process on the basis of a semiconductor process, a plurality of optical waveguide cantilevers can be fabricated from one start substrate. Accordingly, the optical waveguide cantilever 51 can be inexpensively manufactured.

(Embodiment 4)

Figure 7A:
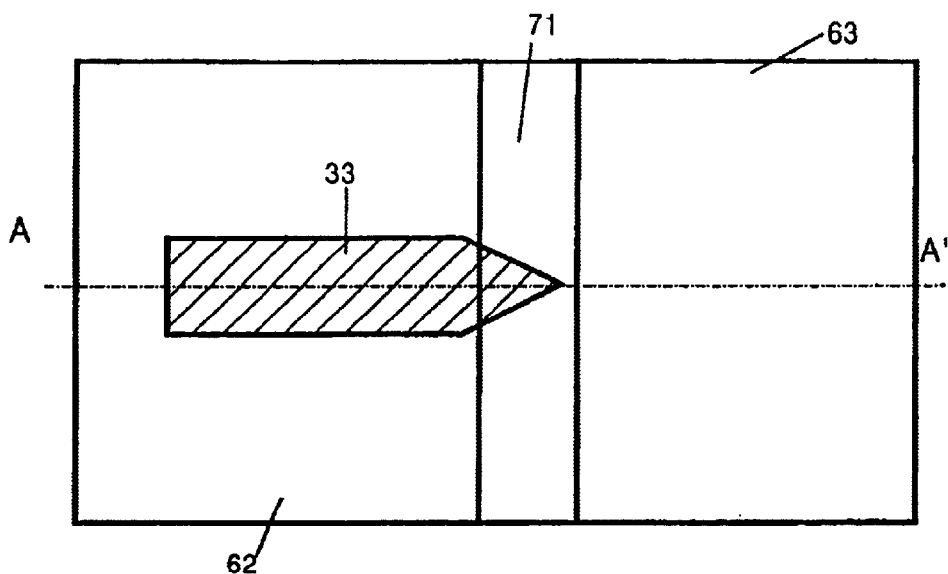
FIGS. 7A and 7B are explanatory views in a manufacturing step of an optical waveguide probe according to embodiment 4 of the present invention.
Figure 7B:
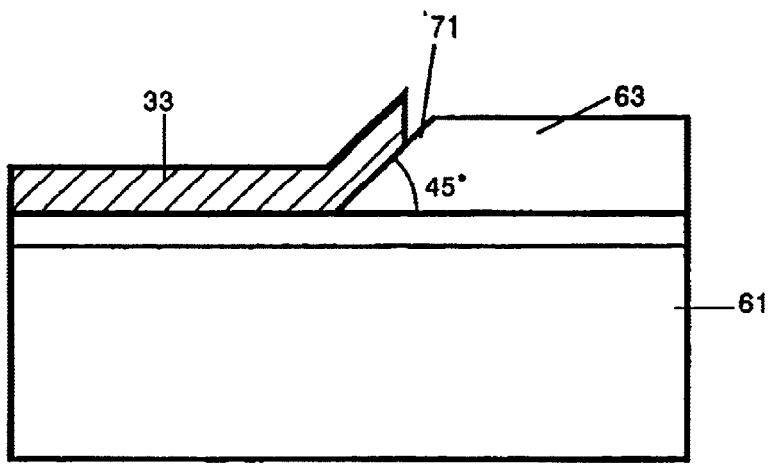

A manufacturing method of an optical waveguide cantilever 51 according to embodiment 4 of the present invention will be described with reference to FIGS. 7A and 7B. FIG. 7A shows a state after the step explained in FIG. 6B in the embodiment 3, and FIG. 7B is a sectional view at a position indicated by A–A' in FIG. 7A. A mask 64 for step portion formation and a mask 65 for release are omitted for simplification.

In FIG. 7A, a start substrate similar to that of the embodiment 3 is used. A predetermined step portion forming mask 64 is formed on the start substrate, and a step portion is formed by using an etching solution (KOH+IPA solution) of a mixture of KOH and several to several tens % of isopropyl alcohol, an etching solution (TMAH+surface active agent solution) of a mixture of TMAH and several to several tens % of surface active agent, an ethylene diamine pyrocatechol solution, or the like. In the KOH+IPA solution or the TMAH+surface active agent solution, an etching rate of a (111) plane and an etching rate of a (110) plane are reversed as compared with etching by the single substance of KOH or TMAH. Accordingly, an angle of an inclined surface 71 in FIG. 7A becomes about 45 degrees.

By the thus formed step portion and the process explained in the embodiment 3, in the optical waveguide cantilever 51, a single surface having an angle of 45 degrees is formed between the waveguide 33 and the probe portion 9. This single surface functions as a mirror. Accordingly, the optical waveguide cantilever 51 can efficiently introduce light into the minute aperture 5, and can improve the generation efficiency of near-field light irradiated from the minute aperture 5.

Besides, by using such a start substrate that plane orientations of both a substrate 61 and an active layer 63 are (100) planes and crystal directions are also the same, it is possible to obtain the optical waveguide cantilever 51 in which a bent portion 10 is made of two surfaces, as in the optical waveguide cantilever 51 explained in the embodiment 3.

The angle of 45 degrees of the bent portion of the optical waveguide cantilever 51 in this embodiment is smaller than the angle of 55 degrees of the bent portion 10 explained in the embodiment 3. Accordingly, the optical waveguide cantilever 51 of this embodiment can guide light to the minute aperture 5 more efficiently than the optical waveguide cantilever 51 explained in the embodiment 3, and the generation efficiency of near-field light irradiated from the minute aperture 5 is improved.

(Embodiment 5)

Figure 8A:
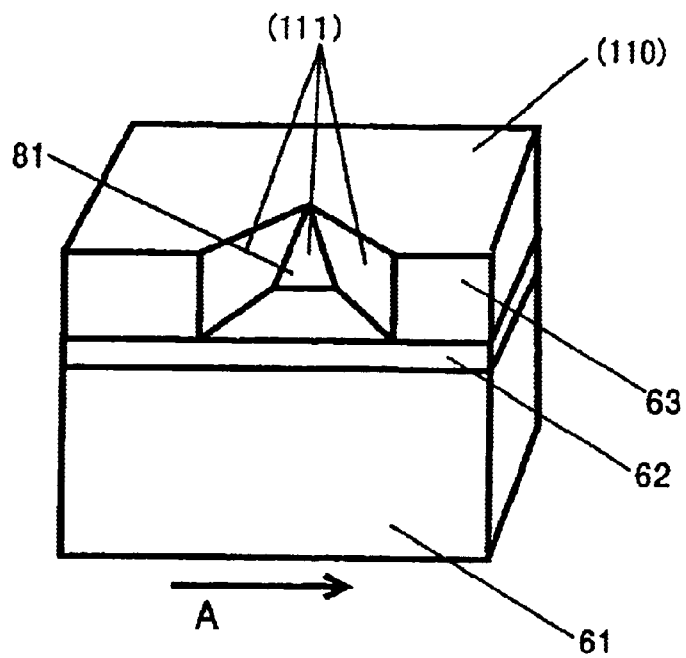
FIGS. 8A to 8C are explanatory views in a manufacturing step of an optical waveguide probe according to embodiment 5 of the present invention.
Figure 8B:
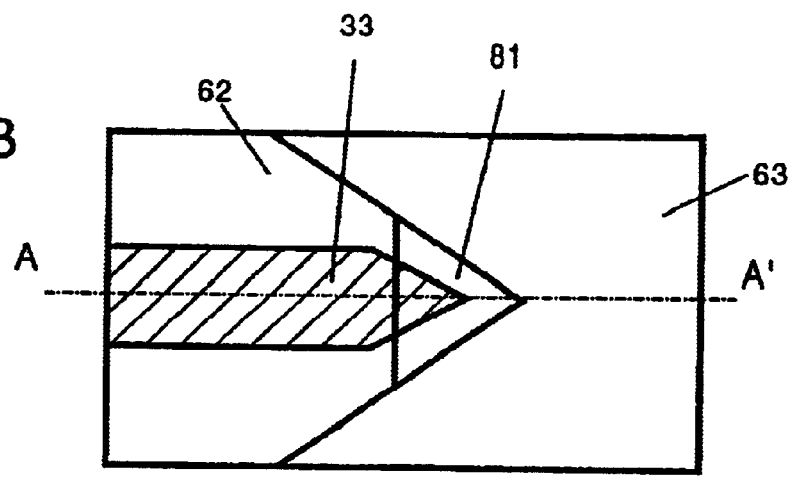
Figure 8C:
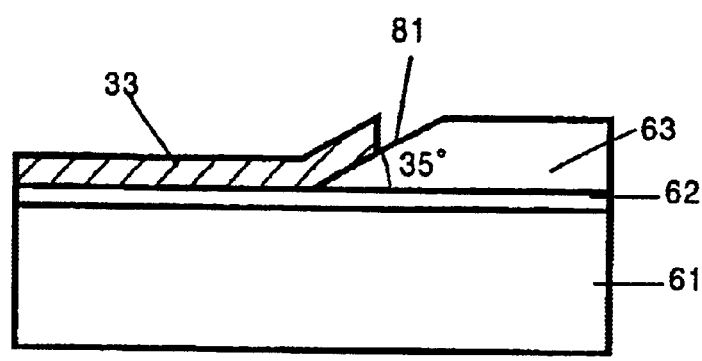

A manufacturing method of an optical waveguide cantilever 51 according to embodiment 5 of the present invention will be described with reference to FIGS. 8A to 8C. FIG. 8A is a perspective view showing a state after the step explained in FIG. 6B in the embodiment 3, FIG. 8B is a top view, and FIG. 8C is a sectional view at a position indicated by A–A' in FIG. 8B. Incidentally, a mask 64 for step portion formation and a mask 65 for release are omitted for simplification.

In this embodiment, silicon single crystal of a (110) plane is used for an active layer 63. A substrate 61 is silicon single crystal of a (100) plane, and a crystal direction indicated by arrow A in FIG. 8A is a <110> direction. A predetermined step portion forming mask 64 is formed, and the active layer 63 is etched by anisotropic etching using KOH, TMAH or the like, so that a step portion as shown in FIG. 8A can be formed. As shown in FIG. 8B, an inclined surface 81 at this time has an angle of about 35 degrees with respect to an oxide film, and a waveguide 33 is formed on this step portion.

By the step portion shown in FIGS. 8A and 8B and the process explained in the embodiment 3, in this optical waveguide cantilever 51, a single surface of the angle of 35 degrees is formed between the waveguide 33 and a probe portion 9. This single surface functions as a mirror. Since the angle is defined by the plane orientation of silicon single crystal, the accuracy of the angle is high. Accordingly, a geometric optical method, a waveguide simulator or the like is used to make such design that light propagated through the waveguide 33 is efficiently propagated to the minute aperture 5, and it is easy to form the waveguide 33, the mirror, the minute aperture 5, and the like exactly in accordance with design values. Since the position of the minute aperture 5 is formed nearer to the tip side of the waveguide as compared with the position of the mirror, the mirror of the angle of 35 degrees smaller than the angle of 45 degrees can more efficiently introduce light into the minute aperture 5. Accordingly, the optical waveguide cantilever 51 of the embodiment 5 of the present invention can efficiently generate near-field light.

In the embodiment 3 to the embodiment 5, although single crystal silicon of the (110) plane or the (100) plane is used for the active layer 63, mirrors having various angles can be formed by silicon single crystal substrates having crystal planes other than these, or combination of substrates other than silicon and the substrate 61.

(Embodiment 6)

A manufacturing method of an optical waveguide cantilever 51 according to embodiment 6 of the present invention will be described with reference to FIGS. 9A to 9F.

Figure 9A:
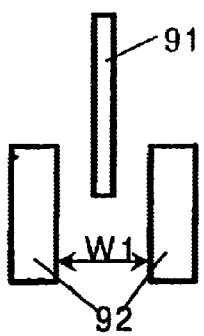
FIGS. 9A to 9F are explanatory views in manufacturing steps of an optical waveguide probe according to embodiment 6 of the present invention.

FIG. 9A is a top view after the step explained in FIG. 6 in the embodiment 3, and a portion of an inclined surface is not shown for simplification. In order to form a waveguide 33, a core 91 is formed, and at the same time, a pair of V groove width defining patterns 92 is formed. The same material, for example, silicon dioxide is used for the core 91 and the V groove width defining patterns 92. An interval WI of the V groove width defining patterns 92 is the same as or narrower than the width of a V groove 42.

Figure 9B:
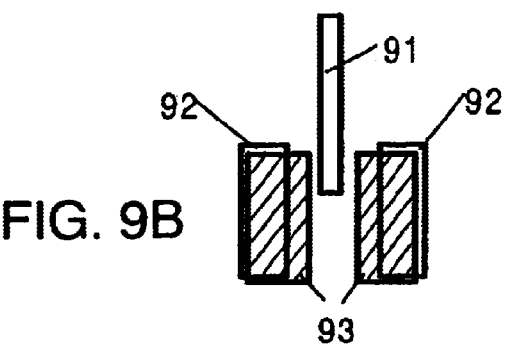
Figure 9C:
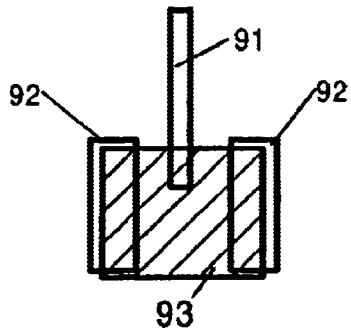

Next, as shown in FIG. 9B or 9C, a protection film 93 is deposited, and patterning is carried out. The protection film 93 is made of a material soluble in KOH or TMAH, for example, metal such as aluminum, chromium, or the like. The protection film 93 is formed so as to protect an inside edge line of each of the V groove width defining patterns 92. Besides, as shown in FIG. 9C, it may be formed so as to cover a part of the core 91.

Figure 9D:
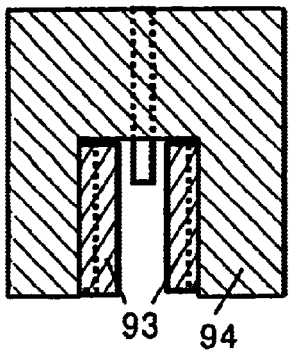
Figure 9E:
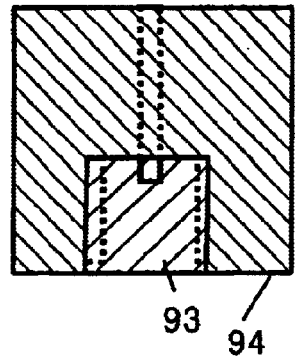

Next, an upper cladding 94 is deposited, and patterning is carried out as shown in FIG. 9D or 9E. FIG. 9D shows a state after the step explained in FIG. 9B, and FIG. 9E shows a state after the step explained in FIG. 9C. The upper cladding 94 is made of a material insoluble in KOH or TMAH, for example, silicon dioxide.

Figure 9F:
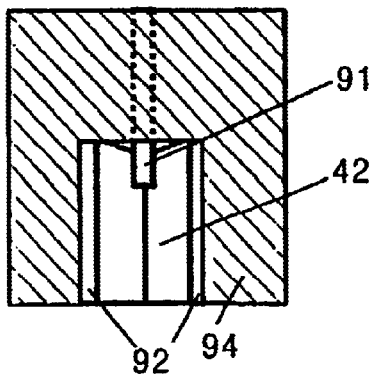

After the above step, crystal anisotropic etching using KOH or TMAH is carried out, so that a V groove 42 as shown in FIG. 9F can be formed. The width of the V groove 42 is determined by the V groove width defining patterns 92. A position slippage between the center axis of the V groove and the center axis of the core 91 is determined by the step of FIG. 9A, and is comparable to the degree of size accuracy of a mask used in a photolithography process, which can be neglected.

In the methods explained in the embodiments 3 to 5, the position accuracy of the optical axis of the waveguide 33 and the V groove 42 is determined by alignment accuracy when the V groove 42 is patterned, and is about ±1 to 3 $\mu$m. However, in the case where the width of the core 4 of the waveguide 33 is several $\mu$m, the efficiency of light introduced into the waveguide 33 is lowered by the alignment accuracy of patterning. However, according to the method of this embodiment, since the slippage between the center axis of the core 91 and the center axis of the V groove 42 is so small that it can be neglected, light can be efficiently introduced into the core 91 and/or light from the core can be efficiently detected. Accordingly, the generation efficiency of near-field light irradiated from the optical waveguide cantilever 51 and/or the detection efficiency of near-field light detected by the optical waveguide cantilever 51 can be improved.

(Embodiment 7)

An optical waveguide cantilever 51 of embodiment 7 of the present invention will be described with reference to FIGS. 10A and 10B.

Figure 10A:
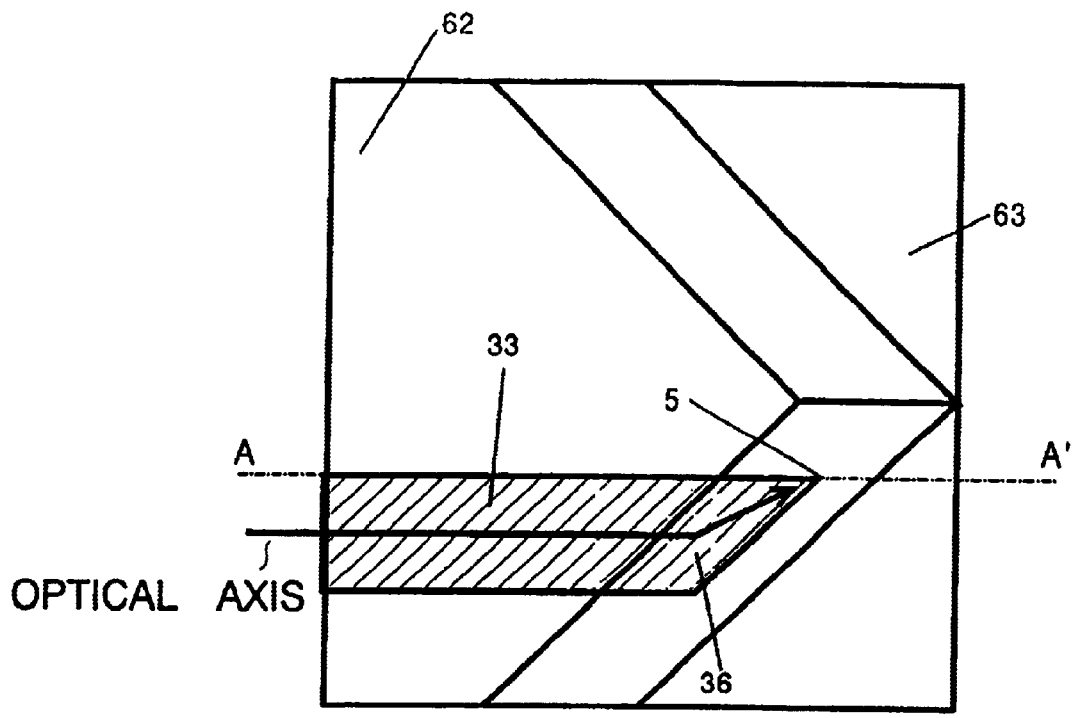
FIGS. 10A and 10B are explanatory views in a manufacturing step of an optical waveguide probe according to embodiment 7 of the present invention.
Figure 10B:
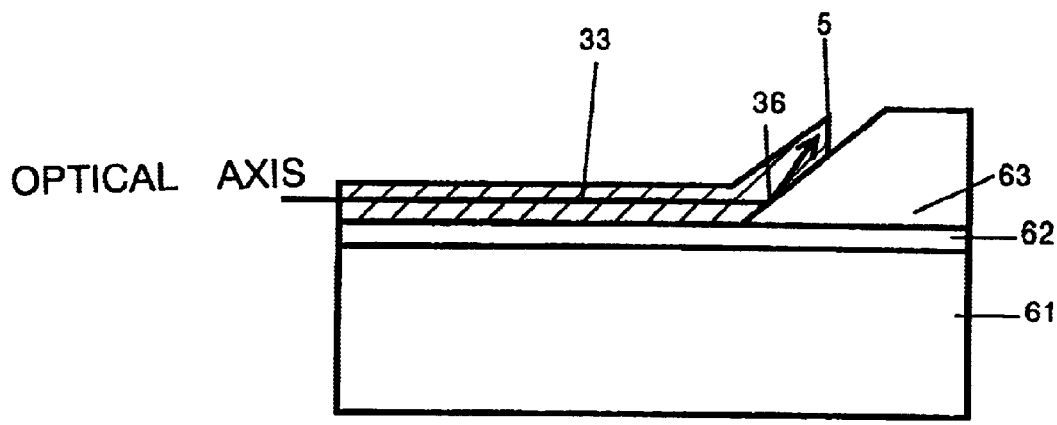

FIG. 10A is a view showing a state after the step explained in FIG. 6B in the embodiment 3, and FIG. 10B is a sectional view at a position indicated by A–A' in FIG. 10A. Incidentally, a mask 64 for step portion formation and a mask 65 for release are omitted for simplification.

In FIG. 10A, a start substrate similar to that shown in FIGS. 3 to 6 is used. After a step portion is formed, as shown in FIG. 10A, an optical waveguide 33 is formed. The shape of the optical waveguide 33 becomes almost the same as that obtained by cutting the shape of the optical waveguide 2 shown in FIG. 1D in the embodiment 1 by a surface including the optical axis in FIG. 1D and vertical to the paper plane of FIG. 1D. An angle of an inclined surface is defined by a plane orientation and crystal direction of an active layer 63, and an inclined surface 36 corresponding to that is formed in the optical waveguide 33. Besides, the position where a minute aperture 5 is formed is the tip of the optical waveguide 33 as shown in FIGS. 10A and 10B.

By the step portion and the optical waveguide 33 formed in this way and the process explained in the embodiment 3, the optical waveguide cantilever 51 includes a deflection surface between the optical waveguide 33 and a probe portion, which is not vertical to the optical axis of the optical waveguide 33 and is made of a single surface. For example, in the case where the active layer 63 is a (100) wafer and the inclined surface 36 is a (111) plane, since the inclined surface 36 is formed obliquely to the optical axis, a minute aperture 5 can be disposed on the optical axis of light propagated through the optical waveguide 33. Accordingly, the optical waveguide cantilever 51 can irradiate near-field light having high intensity from the minute aperture, and can efficiently detect near-field light of the surface of a sample through the minute aperture.

(Embodiment 8)

Figure 11:
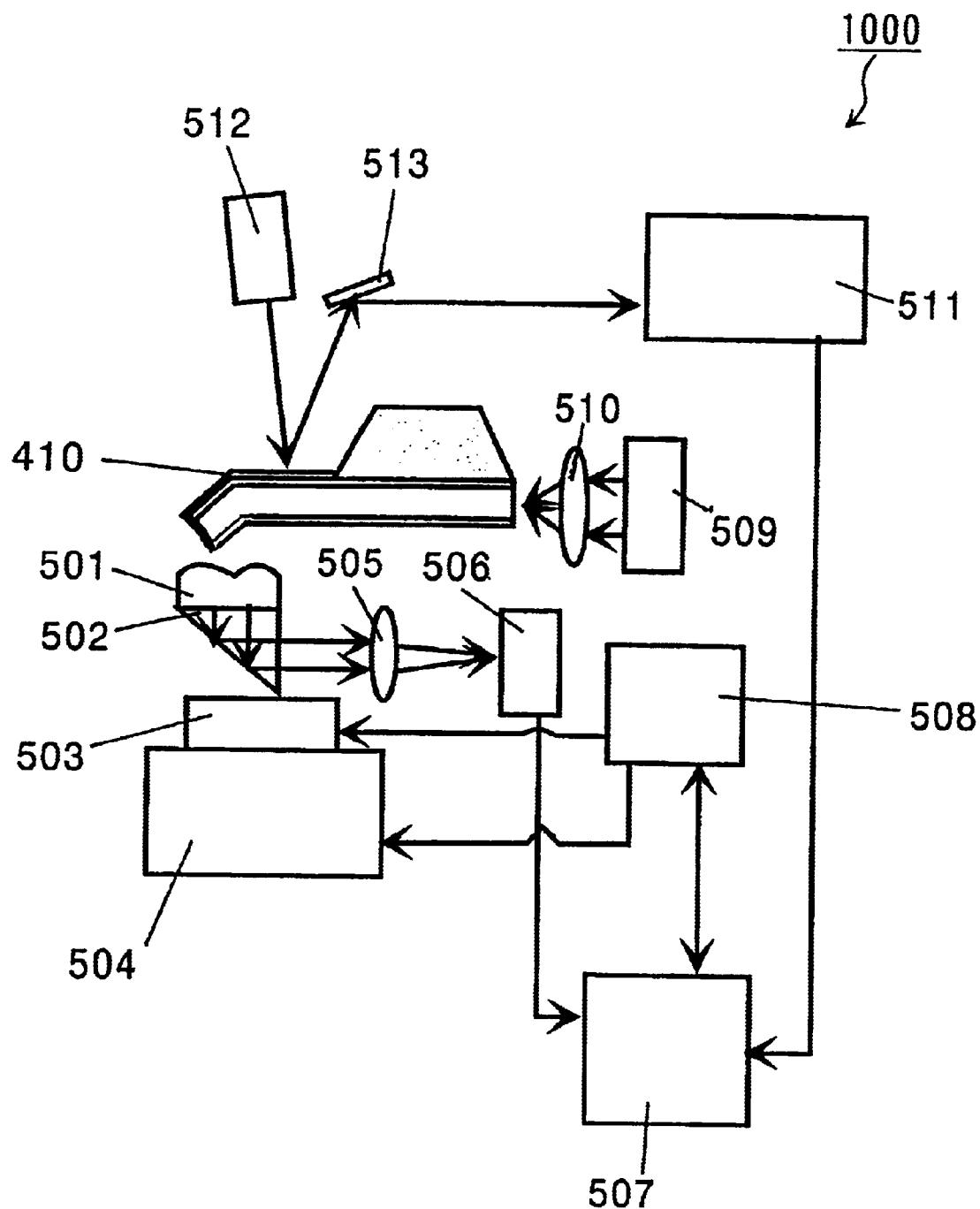
FIG. 11 is a schematic view showing an outline structure of a scanning near-field optical microscope using an optical waveguide probe of the embodiment of the present invention.

FIG. 11 shows a structure of a scanning near-field optical microscope using an optical waveguide probe according to the foregoing embodiment as an optical micro cantilever.

As shown in the drawing, this scanning near-field optical microscope 1000 includes an optical micro cantilever 410, a light source 509, a lens 510 for condensing a propagated light from the light source and irradiating an optical waveguide of the optical micro cantilever, a prism 502 disposed under a sample 501 and reflecting a propagated light obtained by scattering of a near-field light generated at a tip of the optical micro cantilever, a lens 505 for condensing the propagated light from the prism, and a light detector 506 for receiving the propagated light condensed by the lens.

Besides, above the optical micro cantilever, the microscope includes a laser oscillator 512 for oscillating a laser light, a mirror 513 for reflecting the laser light reflected at a free end of the optical micro cantilever, and a photoelectric conversion portion 511 divided into an upper and a lower part, for receiving the laser light reflected at the mirror 513 and performing photoelectric conversion. Further, the microscope includes a fine moving mechanism 503 and a coarse moving mechanism 504 for three-dimensionally moving and controlling the sample 501 and the prism 502, a servo mechanism 508 for driving the fine moving mechanism 503 and the coarse moving mechanism 504, and a computer 507 for controlling the whole. This scanning near-field optical microscope 1000 is suitable for observation of a dynamic mode or a contact mode.

Next, the operation of the scanning near-field optical microscope 1000 will be described. The laser light oscillated from the laser oscillator 512 is reflected at the free end of the optical micro cantilever. The optical micro cantilever is shifted by atomic force between its tip and the sample 501. With this shift, a reflection angle of the laser light reflected at the free end of the optical micro cantilever is deflected, and this deflection is detected by the photoelectric conversion portion 511.

A signal detected by the photoelectric conversion portion 511 is sent to the computer 507. The computer 507 controls the fine moving mechanism 503 and the coarse moving mechanism 504 so that the flexure of the optical micro cantilever does not exceed a set value at the approach of the optical micro cantilever to the sample 501 or the observation of the surface.

The propagated light emitted from the light source 509 is condensed by the lens 510, and is irradiated to the minute aperture through the optical waveguide of the optical micro cantilever. By this, the near-field light is generated in the vicinity of the minute aperture of the optical micro cantilever. On the other hand, optical information of the sample 501 reflected by the prism 502 is condensed by the lens 505, and is introduced into the optical detector 506. The computer 507 receives the signal of the optical detector 506, and detects the optical information of the sample 501 from the signal to prepare a topological image, an optical image or the like.

By using the optical waveguide probe of the present invention in the scanning near-field optical microscope of the structure like this, the scanning near-field optical microscope has effects as follows: That is, since the optical waveguide probe of the present invention has a high intensity near-field light, a high resonance frequency, and a low spring constant, scanning can be made at high speed. Accordingly, a time necessary for observation becomes short. Besides, as compared with an optical fiber probe having a long overlap length, since handling operations of a probe including a mounting operation to the cantilever holder become easy, the operationality of the device is improved.

As described above, as compared with a conventional optical fiber probe of a SNOM, since the optical waveguide probe of the present invention can be made to have a small size, a low spring constant, and a high resonance frequency, scanning can be made at high speed without damaging a sample or the probe.

Besides, since the propagated light can be efficiently reflected at the bent portion, both in the case where near-field light is emitted from the minute aperture and in the case where light is detected through the minute aperture, the light can be efficiently propagated through the waveguide.

Besides, according to the manufacturing method of the optical waveguide probe of the present invention, the optical waveguide probe can be manufactured easily and with excellent mass productivity, reproducibility, and uniformity, and can be provided at low cost.

Besides, according to the embodiment 3 of the present invention, since the oriental flat directions of the support substrate and the active layer are different from each other by 45 degrees, the V groove 42 for introducing light into the core 4 can be easily formed. Accordingly, in addition to the effects explained in the embodiments 1 and 2, light can be efficiently and easily introduced into the core (illumination mode). Besides, light detected through the minute aperture can be efficiently detected through the core and the optical fiber fixed to the V groove (collection mode). Further, the foregoing illumination mode and the collection mode can be carried out at the same time. Moreover, in addition to the optical fiber, an optical element such as a lens or a filter can be positioned and fixed to the V groove, and it becomes easy to efficiently make light incident on the core and/or to efficiently detect light from the core, or to control the wavelength and phase of incident light to the core and/or outgoing light from the core.

Besides, by providing the light introducing portion, since the distance between the optical fiber and the core can be made small without being disturbed by the inclined surface of the V groove, light can be efficiently introduced into the core, and the intensity of near-field light irradiated from the minute aperture can be made high.

Besides, according to the manufacturing method of the optical waveguide cantilever of the embodiment 3 of the present invention, the optical waveguide cantilever can be easily fabricated. Since this manufacturing method is a batch process on the basis of a semiconductor process, a plurality of optical waveguide cantilevers can be fabricated from one start substrate. Accordingly, the optical waveguide cantilever can be inexpensively manufactured.

Besides, according to the embodiment 4 of the present invention, the angle of 45 degrees of the bent portion of the optical waveguide cantilever is smaller than the angle of 55 degrees of the bent portion explained in the embodiment 3. Accordingly, the optical waveguide cantilever of this embodiment can introduce light into the minute aperture more efficiently than the optical waveguide cantilever explained in the embodiment 3, and the generation efficiency of near-field light irradiated from the minute aperture is improved.

According to the embodiment 5 of the present invention, since the angle of the bent portion is an angle defined by the plane orientation of silicon single crystal, the angle accuracy is high. Accordingly, a geometric optical method, a waveguide simulator or the like is used to make such design that light propagated through the waveguide is efficiently propagated to the minute aperture, and it is easy to form the waveguide, the bent portion, the minute aperture, and the like exactly in accordance with design values. Since the position of the minute aperture is formed nearer to the tip of the waveguide than the position of the bent portion, the bent portion of the angle of 35 degrees smaller than the angle of 45 degrees can efficiently introduce light into the minute aperture. Accordingly, the optical waveguide cantilever of the fifth embodiment of the present invention can generate near-field light more efficiently than the optical waveguide cantilever of the fourth embodiment of the present invention.

Besides, according to the embodiment 6 of the present invention, since the slippage between the center axis of the core and the center axis of the V groove is so small that it can be neglected, light can be efficiently introduced into the core and/or light from the core can be efficiently detected. Accordingly, the generation efficiency of near-field light irradiated from the optical waveguide cantilever and/or the detection efficiency of near-field light detected by the optical waveguide cantilever can be improved.

Besides, according to the embodiment 7 of the present invention, the optical waveguide cantilever includes the deflection surface between the optical waveguide and the probe portion, which is not vertical to the optical axis of the optical waveguide and is made of the single surface. For example, in the case where the active layer 63 is the (100) wafer and the inclined surface is the (111) plane, since the inclined surface is formed obliquely to the optical axis, the minute aperture can be disposed on the optical axis of light propagated through the optical waveguide. Accordingly, the optical waveguide cantilever can irradiates near-field light having high intensity from the minute aperture, and can efficiently detect near-field light of the surface of a sample through the minute aperture.

What is claimed is:

1. An optical waveguide probe comprising:
a support member;
a thin film optical waveguide deposited on the support member and having an elongated portion over the support member and a cantilever portion extending beyond the support member;
a probe provided at a tip of the cantilever portion of the optical waveguide and comprising a sharp tip extending in a substantially vertical direction with respect to the optical waveguide, and a minute aperture at the sharp tip of the probe; and
a bent portion joining the cantilever portion of the optical waveguide and the probe, the bent portion having a deflecting function for deflecting a propagated light in the optical waveguide.

2. An optical waveguide probe according to claim 1; wherein a deflection angle of the propagated light at the bent portion is 90 degrees or less.

3. An optical waveguide probe according to claim 1; wherein the propagated light is deflected by a single surface of the bent portion.

4. An optical waveguide probe according to claim 3; wherein the single surface is orthogonal to an optical axis plane extending from the optical waveguide to the minute aperture.

5. An optical waveguide probe according to claim 3; wherein the single surface is not orthogonal to an optical axis plane extending from the optical waveguide to the minute aperture.

6. An optical waveguide probe according to claim 5; wherein the single surface is disposed at an angle of 45 degrees or less with respect to a plane orthogonal to the optical axis plane and including an optical axis of the waveguide.

7. An optical waveguide probe according to claim 1; wherein the bent portion has a plurality of bends defining a plurality of surfaces substantially symmetrical with respect to an optical axis plane extending from the optical waveguide to the minute aperture.

8. An optical waveguide probe according to claim 7; wherein the plurality of surfaces are flat surfaces.

9. An optical waveguide probe according to claim 8; wherein the plurality of flat surfaces are respectively not vertical relative to the optical axis plane.

10. An optical waveguide probe according to claim 1; further comprising a reflective film formed on the bent portion.

11. An optical waveguide probe according to claim 1; further comprising a positioning guide provided at the support member for positioning an optical element relative to the optical waveguide.

12. An optical waveguide probe according to claim 11; wherein the guide is a V-shaped groove formed in the support member.

13. An optical waveguide probe comprising: a support member; and a thin film optical waveguide formed partly on the support member and having a waveguide portion disposed over the support member and a probe portion extending beyond the support member at a given angle relative to the waveguide portion to form a cantilever.

14. An optical waveguide probe according to claim 13; wherein the thin film optical waveguide has a bent portion disposed between the waveguide portion and the probe portion for deflecting light propagating through the thin film optical waveguide.

15. An optical waveguide probe according to claim 14; wherein the bent portion deflects the propagated light by 90 degrees or less.

16. An optical waveguide probe according to claim 14; wherein the bent portion has a plurality of bends defining a plurality of surfaces substantially symmetrical with respect to an optical axis plane extending from the optical waveguide portion to a tip of the probe portion.

17. An optical waveguide probe according to claim 16; wherein the plurality of surfaces are each flat surfaces.

18. An optical waveguide probe according to claim 13; wherein the propagated light is deflected by a single surface of the bent portion.

19. An optical waveguide probe according to claim 13; wherein the single surface is orthogonal to an optical axis of the optical waveguide extending from the waveguide portion to a tip of the probe portion.

20. An optical waveguide probe according to claim 13; further comprising a light reflecting film formed over the waveguide portion and the probe portion except for a minute aperture at a tip of the probe portion.

* * * * *